3,510,212
FILM PROJECTOR WITH AUTOMATIC CORRECTION OF THE FRAMING OF THE PICTURE
Fritz Krumbein and Dietrich Becker, Stuttgart-Mohringen, Germany, assignors to Zeiss Ikon Aktiengesellschaft, Stuttgart, Germany, a German corporation
Filed Nov. 6, 1967, Ser. No. 680,798
Claims priority, application Germany, Nov. 16, 1966, Z 10,917
Int. Cl. G03b 21/46
U.S. Cl. 352—160                    5 Claims

ABSTRACT OF THE DISCLOSURE

A film projector provided with an adjusting means for correcting the position of the picture in the picture window during the forward and reverse movement of the film. The adjusting means including two push-buttons, one for the forward movement and one for the reverse movement of the film, and at least one Bowden cable operatively connected with said two push buttons and with a slidable picture window mask which is adjustable relative to the picture window of the projector.

---

The invention relates to a film projector in which an automatic adjustment of the framing of the picture is effected by the adjusting means which controls the forward and reverse operations of the projector.

It is known to couple the device for the forward and reverse operation of the projector with a device for adjusting the framing of the picture. For the coupling of these two devices are used lever mechanisms having a number of joints and fulcrums. Such lever mechanisms require much space. The more joints and fulcrums they contain, the greater must the precision be in manufacturing these linkages if the mechanism is to operate sufficiently acurate. For this reason only relatively closely adjacent parts can be connected by these known lever gearings, yet the entire mechanism still remains unduly complex.

Another disadvantage of these known devices is that they are workable only when the projector is locally manually operated. If one of the popular remote control devices is used, they fail.

It is the object of the present invention to provide with simplest means a connection between the adjusting device for the forward and reverse operation of the projector and the device for the framing of the picture. Such a connection according to the invention is to take up little space, operate sufficiently accurate without a great deal of complex mechanical means and permit the installation of the forward and reverse switches at almost any place of the projector housing or even detached therefrom. The latter is desirable for the reason that thereby almost any requirement as to exterior design and ease of operation can be met.

This is accomplished according to the invention by providing a Bowden cable for connecting the forward-reverse adjusting means with the member for the correction of the framing of the picture.

The forward-reverse adjusting means according to the invention may comprise two push-buttons which act upon the Bowden cable by way of a swivel support.

According to another feature of the invention, the two push buttons serving as the forward-reverse adjusting means may each be connected to one of two Bowden cables which act upon the member for the correction of the framing of the picture in opposite directions of each other.

The Bowden cable or cables may according to the invention also engage a slidably mounted aperture mask and an adjusting member for moving the pivotable gripper bearing.

According to still another feature of the invention, the member for adjusting the pivotable gripper bearing which is actuated by one or more Bowden cables may be part of a device used for the manual framing of the picture.

These and other objects of the invention will in the following be described in detail by way of two exemplary embodiments illustrated in the accompanying drawings. Details not pertinent to the invention are omitted for clarity of illustration.

Figure 1:
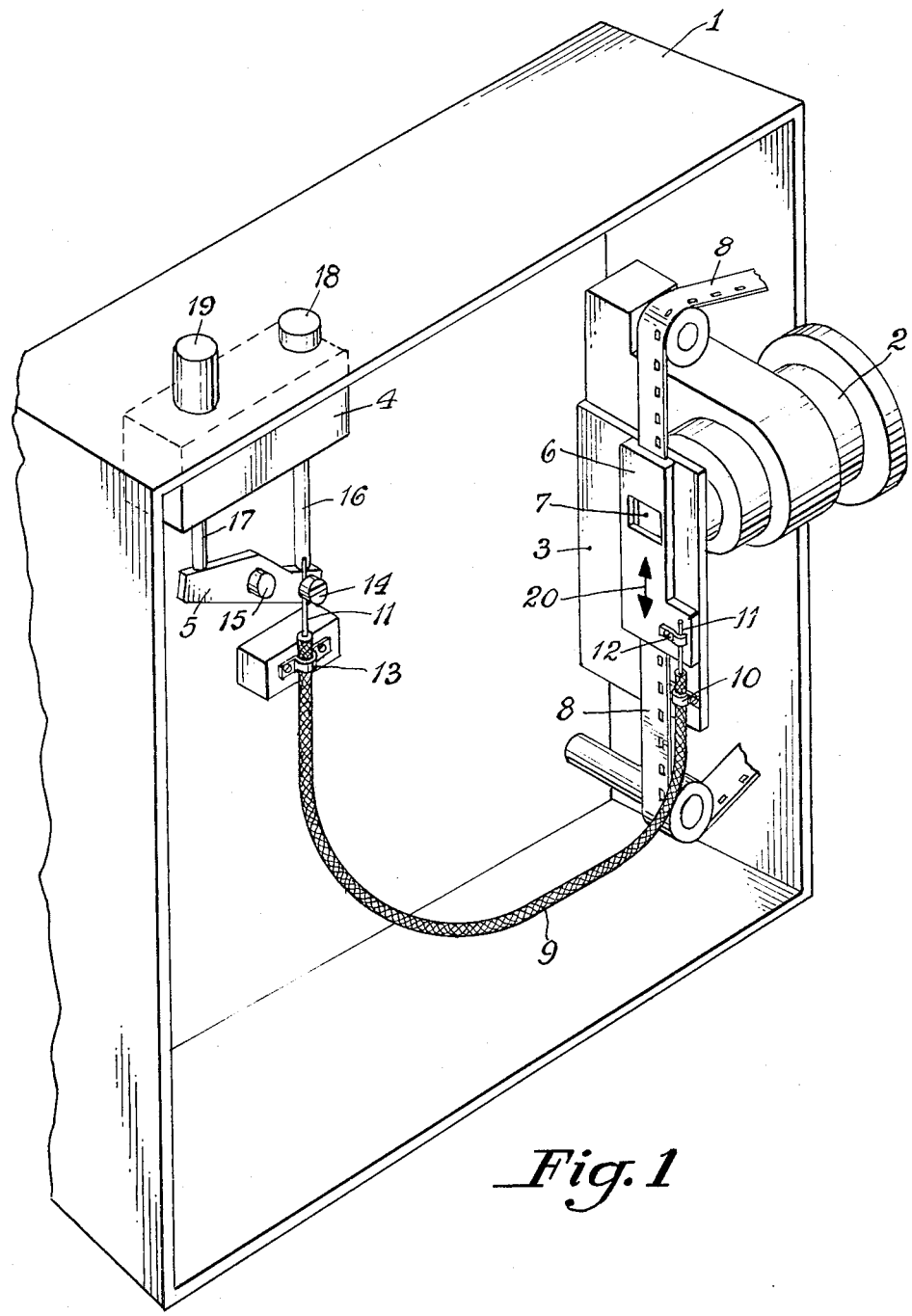
FIG. 1 is a simplified perspective view of the adjusting device according to the invention as applied to the adjustment of a picture window mask.

Referring to FIG. 1, in a projector housing 1 are arranged a lens system 2, a film track 3, a switch bar 4 and a swivel base 5. Vertically slidably secured to the film track 3 is a picture window mask 6 having a picture window 7. Between the film track 3 and the picture window mask 6 is guided a film strip 8. Further attached to the film track 3 is one end of the casing 9 of a Bowden cable by means of a clip 10. The core wire 11 of the Bowden cable is connected at 12 to the slidable picture window mask 6. The other end of the casing 9 of the Bowden cable is attached to the projector housing 1 near the swivel base 5 by means of a clip 13. The core wire 11 protruding from this end of the Bowden cable is attached to one end of the swivel base 5 at 14.

The swivel base 5 is pivoted between its ends to a pivot pin 15 and the two arms of the base project from opposite sides of the pivot pin 15 and extend into the range of movement of vertically movable pressure pins 16 and 17 associated with two push buttons 18 and 19 which are vertically slidably mounted in the switch bar 4. A double arrow 20 indicates the vertical slidability of the picture window mask 6.

If the button 18 for forward motion of the projector drive is pushed, the pin 16 moves downward and engages the swivel base 5 which in turn actuates the Bowden cable 11 which transmits the motion to the picture window mask 6 and thereby determines its position for the forward motion of the film 8. Pushing the button 19 for reverse motion of the projector drive causes the pin 17 to pivot the swivel base 5 anti-clockwise about the pivot pin 15 and thereby move the pin 16 with the associated push button 18 for forward motion into its shut-off position. At the same time the wire 11 of the Bowden cable 12 is pulled upwardly and thereby moves the picture window mask 6 into the position in which the individual pictures on the film strip 8 each are correctly framed in the picture window 7.

Figure 2:
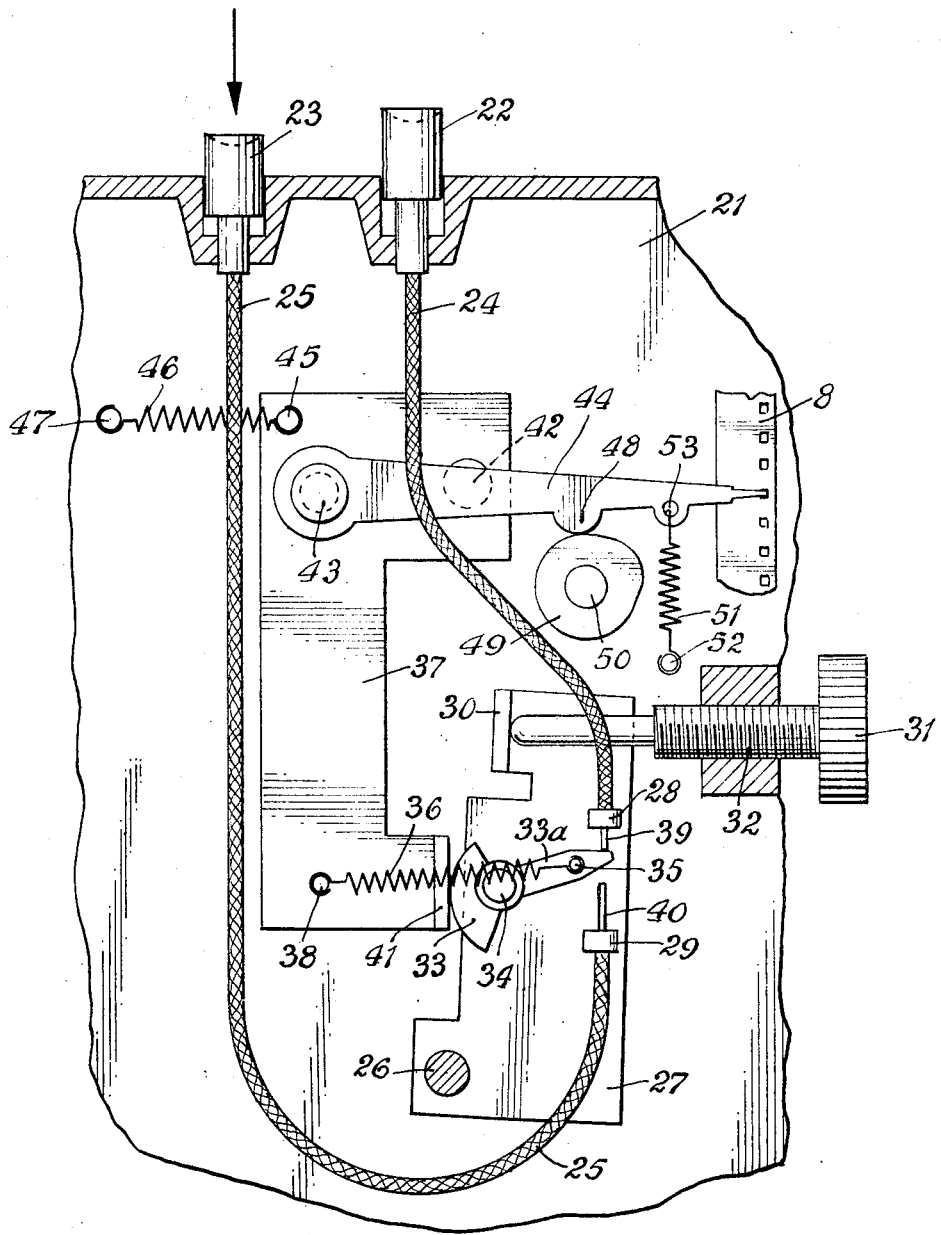
FIG. 2 is a simplified diagrammatic view of the adjusting device according to the invention as applied to the adjustment of a pivotable gripper bearing.

The embodiment of the invention according to FIG. 2 is equipped with a device for framing of the pictures by hand combined with an automatic adjustment device for changing from forward to reverse. The projector housing 21 is provided with a forward button 22 and a reverse button 23 connected by Bowden cables 24 and 25, respectively, which are both secured by clips 28 and 29 to a plate 27 arranged in a vertical plane and pivotably attached near its lower portion to a horizontal pin 26 fixedly secured to the housing 21. The pivotable plate 27 has at its upper portion an angular extension 30 which is engaged by a horizontal adjusting screw 31 in a manner to be described later. This adjusting screw 31 extends threadedly through a threaded bore 32 in the housing wall 21 and serves as a manual adjusting member for framing of the picture, i.e. to compensate for deviations in picture positions on different film copies.

The pivotable plate 27 also carries between its ends a mushroom-shaped adjustment member 33 connected to it by a horizontal bearing pin 34. Attached to the stem 33a of the mushroom-shaped member 33 is a pin 35 to which one end of a tension spring 36 is attached, the other end of which is secured to a pin 38 mounted on the lower end of a likewise pivotable plate 37 arranged in a vertical plane. The outer end of the stem 33a of the adjusting member 33 extends into the operative range of the oppositely arranged wires 39 and 40 of the Bowden cables 24 and 25, respectively. The pivotable plate 37 has at its lower end a rectangular extension 41 which is engaged by the head of the mushroom-shaped adjusting member 33 due to the action of the tension spring 36. This head portion of the member 33 is of such a curved shape that, as the adjusting member 33 is caused to pivot, the distance between the bearing pin 34 and the extension 41 of the plate 37 is changed.

The upper portion of the plate 37 is pivotably mounted on a bearing pin 42 and carries a pin 43 to which in turn the rear end of a gripper 44 is pivotally secured. Furthermore, the pivotable plate 37 is provided with an aperture 45 into which is inserted one end of a spring 46 the other end of which is secured to the projector housing 21 by means of a pin 47.

The gripper 44 has between its ends a semi-circular enlargement 48 which engages a control cam 49 mounted on the horizontal shutter shaft 50 of the projector. A spring 51 attached with one end to the projector housing 21 by a pin 52 is secured with its other end in an aperture 53 in the forward end of the gripper 44 and holds the gripper 44 with its enlargement 48 in engagement with the control cam 49.

The position of the adjusting device as illustrated in FIG. 2 is that of the reverse motion of the projector. The reverse button 23 mounted slidably in a socket in the top wall of the projector housing is depressed. The core wire 40 of the Bowden cable 25 has pivoted the adjusting member 33 anti-clockwise and due to the particular shape of the head of the mushroom-like member 33 the distance of the rectangular extension 41 of the pivotable plate 37, which under the action of the tension spring 36 engages said head, with respect to the bearing pin 34 has been changed. At the same time, the pivotable plate 37 was caused to pivot about its upper bearing pin 42 by the action of the spring 46. Together with the plate 37 was also moved the pin 43 serving as a bearing for the gripper 44. The desired adaptation of the gripper 44 to the reverse situation is completed.

If the projector is to be changed from reverse to forward motion, then the forward button 22 must be pushed. The wire 39 of the Bowden cable 24 strikes the end portion of the stem 33a of the mushroom-shaped adjusting member 33 and causes it to pivot clockwise into its other extreme position. This results in a pushing back of the core wire 40 of the Bowden cable 25 so that the reverse button 23 is returned to its rest position. The adjusting member 33 due to the shape of its head and its positioning again changes the distance between the bearing pin 34 and the angular projection 41. The plate 37 is pivoted about its bearing pin 42 against the action of the spring 46 and the gripper bearing, i.e. the pin 43, is displaced clockwise.

During both of the aforedescribed operations the pivotable plate 27 remains unchanged in its position. It is fixed by the shaft 26 which is fixedly secured to a wall of the projector housing 21 and by the adjusting screw 31 which engages the rectangular extension 30 of the pivotable plate 27 due to the action of the spring 46.

For a framing of the picture by hand, the adjusting screw 31 is manually rotated. This causes the plate 27 to pivot about the axis of the pin 26 and, as a consequence, the plate 37 is also pivoted for the purpose of adjusting the gripper bearing in the form of the pin 43.

What we claim is:

1. A film projector provided with a picture window, a movable adjustment member for framing of the picture in said picture window, a manually operable adjusting means including two selectively actuatable push buttons for operating said movable adjustment member during the forward and reverse operation of said projector, and Bowden cable means connecting said manually operable means with said movable adjustment member.

2. A film projector according to claim 1, including a swivel base operatively connected with said two push buttons, and means connecting said swivel base with said Bowden cable means.

3. A film projector according to claim 1, in which said Bowden cable means comprises two Bowden cables which engage said adjustment member for framing the picture in opposite direction.

4. A film projector provided with a picture window and an adjusting means for framing the picture in said picture window during the forward and reverse operation of the projector, including a pivotally mounted film advancing gripper, an adjustable bearing for said gripper, two Bowden cables and means selectively operated by said two Bowden cables for adjusting said gripper bearing for forward and reverse operation of said projector.

5. A film projector according to claim 4, including manually operable means for adjusting said gripper bearing independently of said Bowden cables.

References Cited

UNITED STATES PATENTS 2,974,840   3/1961   Kuhnert et al. _____ 352—160

NORTON ANSHER, Primary Examiner

R. A. WINTERCORN, Assistant Examiner

U.S. Cl. X.R.

226—57, 72; 242—55.12; 352—173